(12) United States Patent
Maezono (10) Patent No.: US 7,856,181 B2
(45) Date of Patent: Dec. 21, 2010

(54) STEREOSCOPIC IMAGING DEVICE (75) Inventor: Nobuyoshi Maezono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 150 days.

(21) Appl. No.: 12/177,439

(22) Filed: Jul. 22, 2008

(65) Prior Publication Data
US 2009/0123144 A1    May 14, 2009

(30) Foreign Application Priority Data

Jul. 25, 2007    (JP) ............... 2007-193717

(51) Int. Cl.
*G03B 35/00* (2006.01)
*H04N 13/00* (2006.01)
(52) U.S. Cl. .................... 396/324; 348/42
(58) Field of Classification Search ........... 396/322, 396/324, 326, 327, 334, 333; 348/42, 47, 348/49, 373–376; 353/6, 7; 359/351, 372, 359/373
See application file for complete search history.

(56) References Cited

U.S. PATENT DOCUMENTS 7,170,558 B2 * 1/2007 Yokota et al. ............ 348/337
7,206,136 B2 * 4/2007 Labaziewicz et al. ....... 359/676

FOREIGN PATENT DOCUMENTS

| JP | 7-152096 A | 6/1995 |
| JP | 8-304943 A | 11/1996 |
| JP | 2002-112288 A | 4/2002 |

* cited by examiner

*Primary Examiner*—W. B. Perkey
*Assistant Examiner*—Minh Q Phan
(74) *Attorney, Agent, or Firm*—Sughrue Mion, PLLC (57) ABSTRACT A compound-eye camera comprises: a camera body substantially shaped like a rectangular solid having a front side and a back side larger than other sides and including a display device on the back side; and substantially L-shaped first and second lens barrels, each storing a refractive optical system including two reflective optical elements for refracting a photographing optical axis twice, the lens barrels guiding subject images incident on a pair of right and left objective lenses to image sensors. In the camera, the substantially L-shaped first and second lens barrels are each disposed along two adjacent inner surfaces of the camera body. Thereby, a compound-eye camera which has excellent portability and enables the installation of a large display device is achieved.

6 Claims, 8 Drawing Sheets

(RELATED ART)

STEREOSCOPIC IMAGING DEVICE

BACKGROUND OF THE INVENTION

1. Field of the Invention

The present invention relates to a stereoscopic imaging device and particularly relates to a stereoscopic imaging device which can photograph an image enabling a stereoscopic view (three-dimensional image).

2. Description of the Related Art

Japanese Patent Application Laid-Open No. 2002-112288 describes a stereoscopic photographing optical unit having a variable base length.

Japanese Patent Application Laid-Open No. 8-304943 describes a stereoscopic photographing device which integrally holds a pair of movable lenses for right and left eyes and includes a support mechanism provided at the center of the pair of right and left movable lenses to support the movable lenses movably along the optical axis.

Japanese Patent Application Laid-Open No. 7-152096 describes a compound-eye imaging system which is made up of a plurality of lens pairs obtained by integrally molding a plurality of lenses having the same radius of curvature and thickness, and includes a lens moving device at the center of the lens pairs.

SUMMARY OF THE INVENTION

Figure 7:
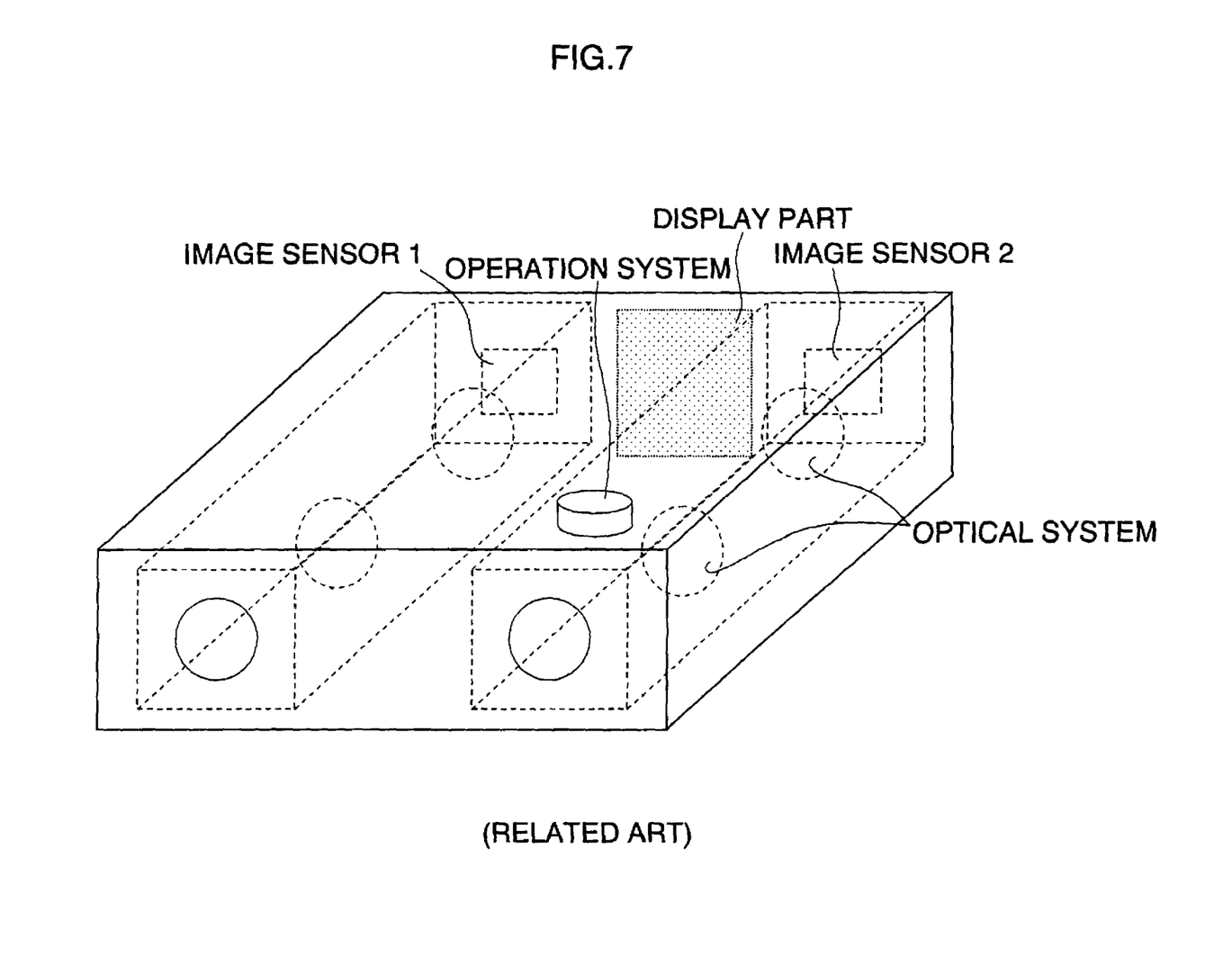
FIG. 7 shows an example of a conventional compound-eye digital camera 1.

However, in the inventions described in Japanese Patent Application Laid-Open No. 2002-112288, No. 8-304943, and No. 7-152096, as shown in FIG. 7, lens barrels are disposed along the depth direction. Thus, the configuration of FIG. 7 is extremely large in the depth direction as compared with typical compact digital cameras, causing poor portability. Further, as the longitudinal size of the camera body is reduced when the lens barrels are disposed along the depth direction, a monitor such as a liquid crystal panel disposed on the back side of the camera body becomes extremely small in size.

Figure 8:
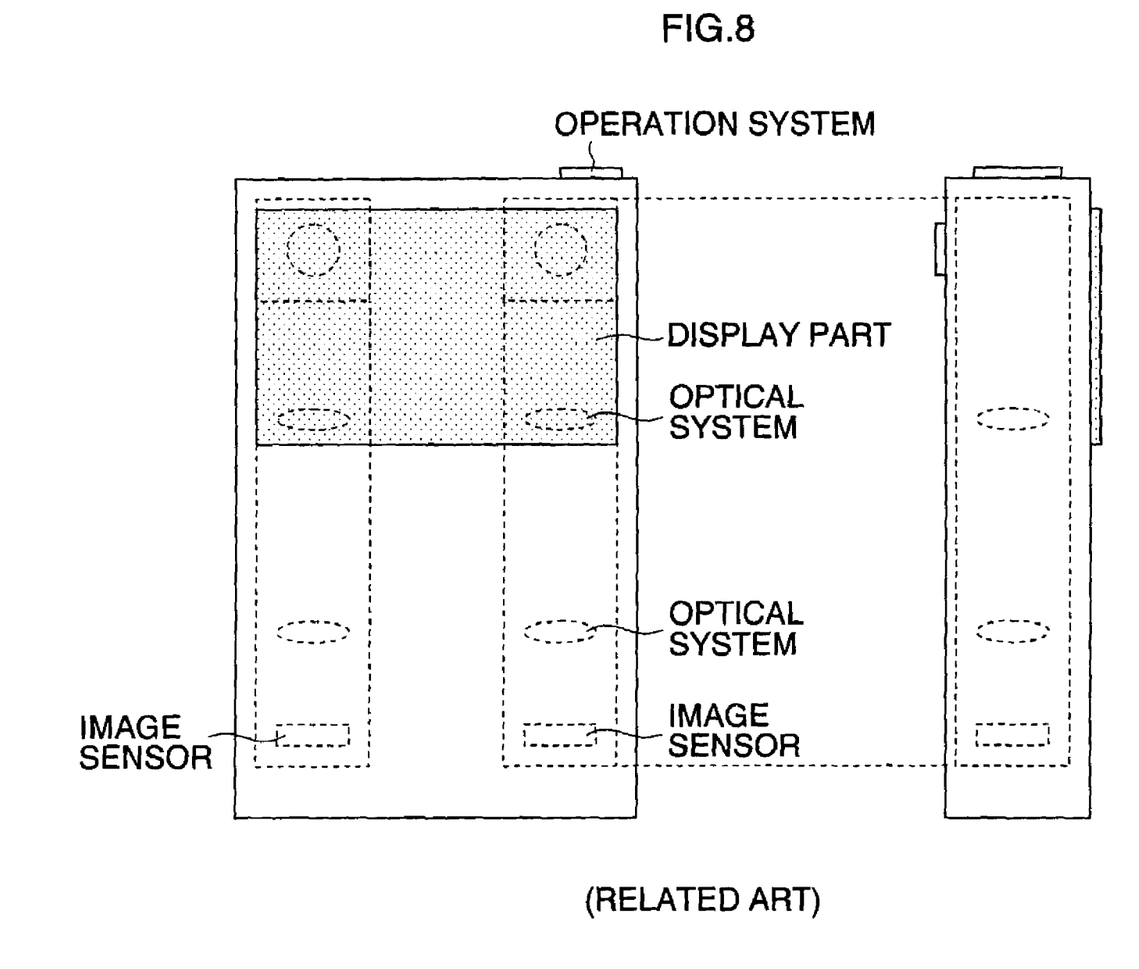
FIG. 8 shows another example of the conventional compound-eye digital camera 1.

When a refractive optical system shown in FIG. 8 is employed, it is necessary to increase the longitudinal size of a camera body to have a long optical path, causing poor portability. Further, when a monitor having a typical aspect ratio is disposed on the back side of the camera body, the monitor can only have a small area relative to the area of the back side because the area of the monitor is determined based on the lateral size of the camera body.

The present invention is devised in view of such circumstances, and aims to provide a stereoscopic imaging device which has excellent portability and enables installation of a large display device.

A stereoscopic imaging device according to a first aspect includes: a camera body substantially shaped like a rectangular solid having a front side and a back side larger than the other sides and including a display device on the back side; and substantially L-shaped first and second lens barrels, each storing a refractive optical system including two reflective optical elements for refracting a photographing optical axis twice, the lens barrels guiding subject images incident on a pair of right and left objective lenses to image sensors, wherein the substantially L-shaped first and second lens barrels are each disposed along the two adjacent inner surfaces of the camera body.

According to the stereoscopic imaging device of the first aspect, the substantially L-shaped first and second lens barrels are each disposed along the two adjacent inner surfaces of the substantially shaped like a rectangular solid camera body. Each of the lens barrels stores the refractive optical system including the two reflective optical elements for refracting the photographing optical axis twice, and guides the subject image incident on right or left objective lens to the image sensor. With this configuration, it is possible to provide a stereoscopic imaging device which can reduce the thickness of the camera body and enables the installation of a large display device on the back side of the camera body. Further, the lens barrels are disposed in the camera body along the shape of the camera body, so that the lens barrels with long optical path length can be efficiently disposed in the compact body of camera.

A stereoscopic imaging device according to a second aspect, in the stereoscopic imaging device of the first aspect, wherein the substantially L-shaped first and second lens barrels are disposed so as to have point symmetry with respect to the central point of the camera body.

According to the stereoscopic imaging device of the second aspect, the substantially L-shaped first and second lens barrels are disposed on the inner surfaces of the camera body so as to have point symmetry with respect to the central point of the camera body. With this configuration, the first and second lens barrels can be identical in shape. Thus, the same mold can be used, thereby reducing the cost.

A stereoscopic imaging device according to a third aspect, in the stereoscopic imaging device of the first aspect, wherein the substantially L-shaped first and second lens barrels are disposed in the camera body so as to have line symmetry with respect to the vertical center line of the camera body.

According to the stereoscopic imaging device of the third aspect, the substantially L-shaped first and second lens barrels are disposed along the inner surfaces of the camera body so as to have line symmetry with respect to the vertical center line of the camera body. With this configuration, a region not including the first and second lens barrels is expanded and components such as a battery and a memory card can be easily laid out. In addition, the components laid out can have good removability.

A stereoscopic imaging device according to a fourth aspect, in the stereoscopic imaging device of any one of the first to third aspects, wherein the refractive optical system includes: an objective lens; a first reflective optical element for refracting, by 90°, a photographing optical axis of the subject image incident through the objective lens; a second reflective optical element for further refracting, by 90°, the photographing optical axis having been refracted by the first reflective optical element so as to be orthogonal to the photographing optical axis of the subject image incident on the objective lens; zoom lenses; and focus lenses.

According to the stereoscopic imaging device of the fourth aspect, each of the substantially L-shaped first and second lens barrels includes: an objective lens; a first reflective optical element for refracting, by 90°, the photographing optical axis of the subject image incident through the objective lens; a second reflective optical element for further refracting, by 90°, the photographing optical axis having been refracted by the first reflective optical element so as to be orthogonal to the photographing optical axis of the subject image incident on the objective lens; the zoom lenses; and the focus lenses. In this way, the optical axis is refracted by the first reflective optical element and the second reflective optical element in a skew position, so that the optical path length can be longer than that of a typical refractive optical system. Further, the first and second lens barrels including the lenses and the like disposed on the refracted optical axes can be substantially L-shaped.

The present invention can provide a stereoscopic imaging device which has excellent portability and enables the installation of a large display device.

DETAILED DESCRIPTION OF THE PREFERRED EMBODIMENTS

A preferred embodiment for implementing a stereoscopic imaging device according to the present invention will now be described in accordance with the accompanying drawings.

Figure 1:
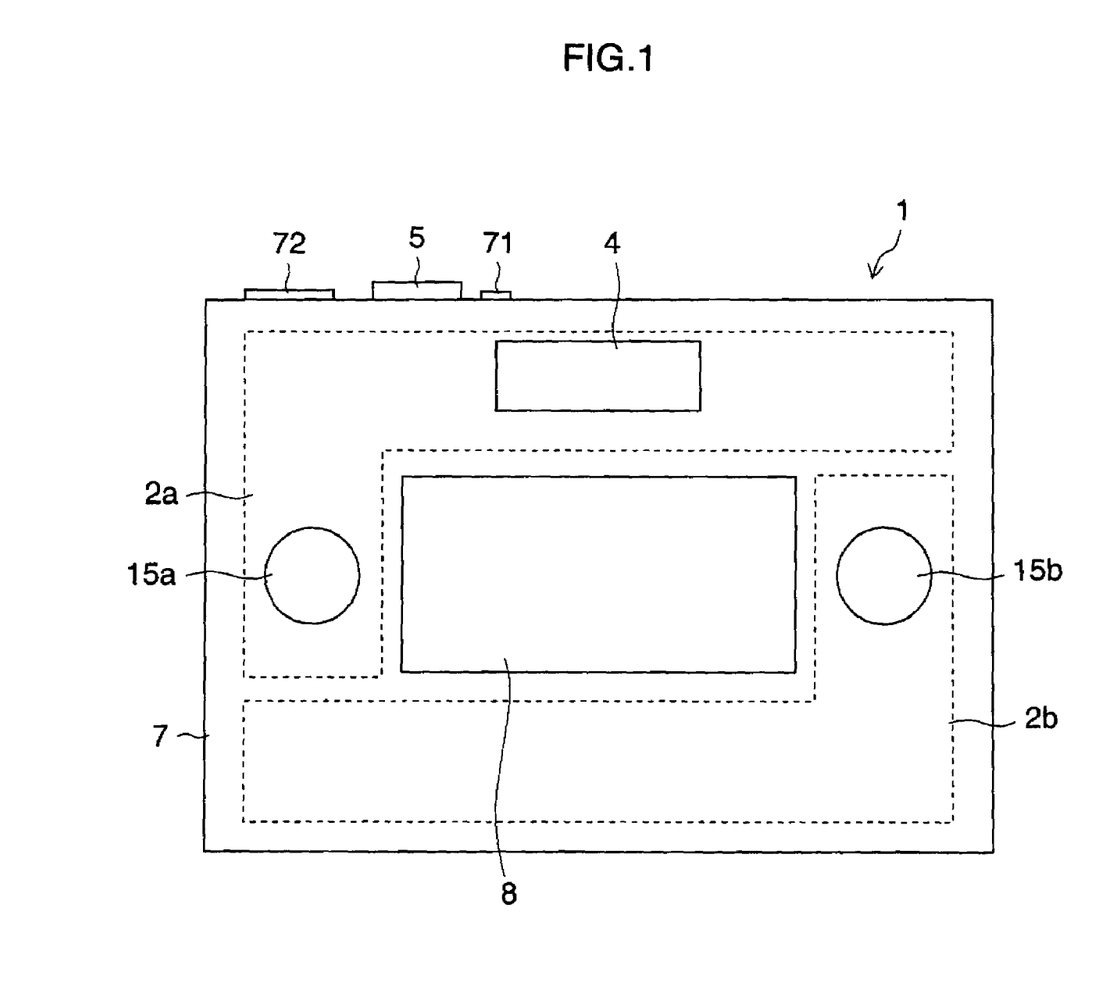
FIG. 1 is a plan view showing a compound-eye digital camera 1 to which the present invention is applied.
Figure 2:
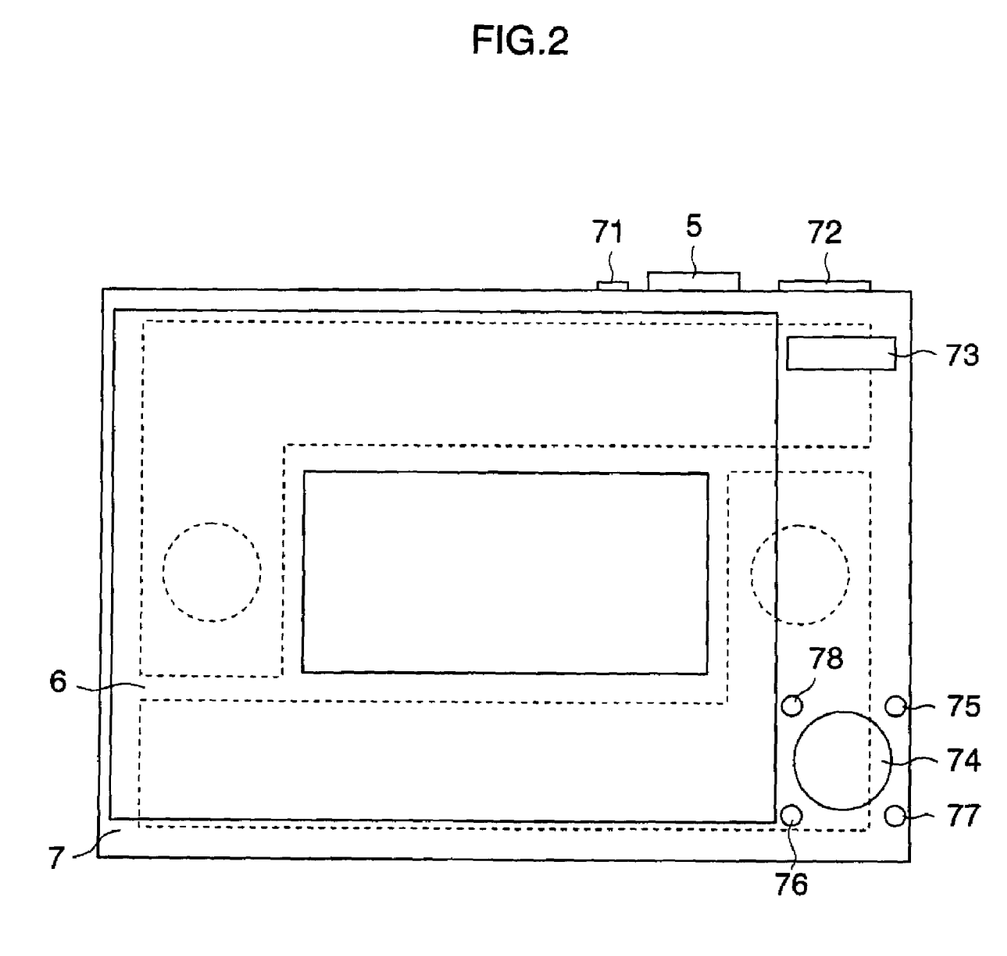
FIG. 2 is a rear view showing the compound-eye digital camera 1.

FIG. 1 is a plan view showing a compound-eye digital camera 1. FIG. 2 is a rear view showing the compound-eye digital camera 1.

The compound-eye digital camera 1 includes a plurality of imaging systems (two imaging systems in FIG. 1) and can photograph a stereoscopic image of the same subject viewed from a plurality of points (two points on the right and left in FIG. 1).

A camera body 7 of the compound-eye digital camera 1 is substantially shaped like a rectangular solid. As shown in FIG. 1, the front side of the camera body 7 mainly includes a first objective lens 15a of a first imaging system 2a, a second objective lens 15b of a second imaging system 2b, a strobe 4, and a battery cover 8 which can be opened and closed. The inner side of the battery cover 8 includes a battery case for storing a battery 68 and a memory card slot and the like for loading a memory card 38. Further, the top surface of the camera body 7 includes a release switch 5, a power button 71, a mode dial 72, and so on.

As shown in FIG. 2, the rear side of the camera body 7 includes a monitor 6, a zoom button 73, a cross button 74, a MENU/OK button 75, a DISP button 76, a BACK button 77, and a macro button 78.

Moreover, the bottom of the camera body 7 includes a tripod screw hole (not shown).

The first imaging system 2a for photographing an image for a right eye and the second imaging system 2b for photographing an image for a left eye are disposed such that lens optical axes L1 and L2 are disposed in parallel with each other to form a predetermined angle. The first objective lens 15a and the second objective lens 15b are disposed on the optical axes L1 and L2, respectively. When the compound-eye digital camera 1 is powered on, covers (not shown) provided on the front sides of the first objective lens 15a and the second objective lens 15b are opened to expose the lenses on the front side of the camera body 7, so that subject light is incident on the lenses. The first imaging system 2a and the second imaging system 2b will be specifically described later.

Figure 3:
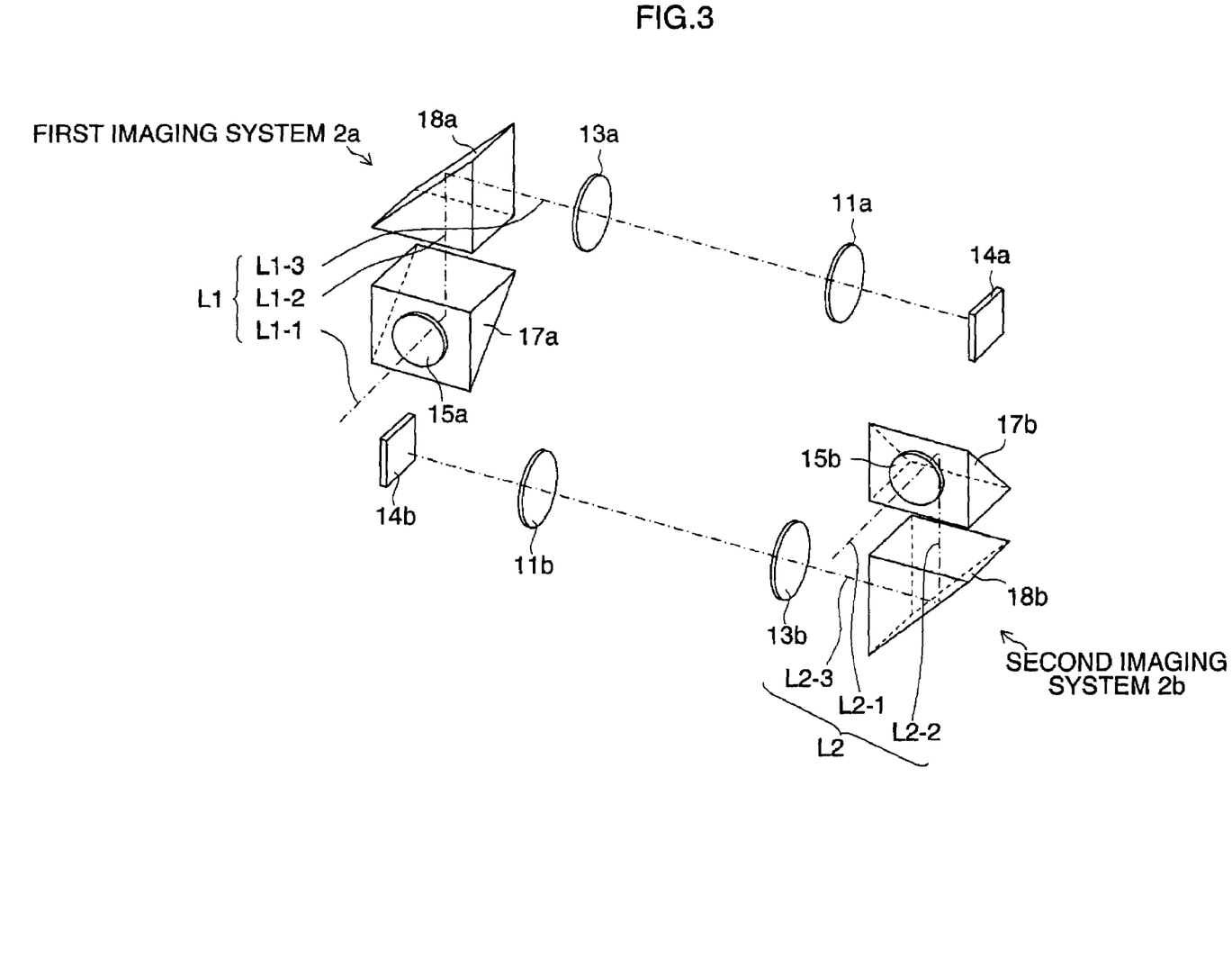
FIG. 3 is a perspective view showing the main part of the compound-eye digital camera 1.

An operation part 3 in FIG. 3 is made up of the power button 71, the mode dial 72, the zoom button 73, the cross button 74, the MENU/OK button 75, the DISP button 76, the BACK button 77, the macro button 78, a 2D/3D setting switch (not shown) for the instruction of switching of 2D mode for photographing a single viewpoint image and 3D mode for photographing a multiple viewpoint image, a switch (not shown) for flashing, an information position designation key (not shown) for executing a menu item selected by the cross key or cancelling the selection, and so on. A proper operation on the operation part 3 enables various operations including powering on/off, switching among various modes (photographing mode, bracket photographing mode, playback mode, erase mode, edit mode, and so on), and zooming.

The power button 71 acts as the power switch of the compound-eye digital camera 1. The compound-eye digital camera 1 is powered on/off by pressing the power button 71.

The mode dial 72 acts as a switching device which switches between the playback mode and the photographing mode of the compound-eye digital camera 1 and can rotate between "playback position" and "photographing position". The compound-eye digital camera 1 is set in the playback mode by placing the mode dial 72 at "playback position" and is set in the photographing mode by placing the mode dial 72 at "photographing position". Further, the mode dial 72 is used for setting the photographing modes of automatic photographing, manual photographing, and so on. The mode dial 72 is rotatably provided on the top surface of the camera body 7 and can be set at "2D still picture position", "2D moving picture position", "3D still picture position" and "3D moving picture position" by a clicking mechanism (not shown). By setting the mode dial 72 at "2D still picture position", the compound-eye digital camera 1 is set into 2D still picture photographing mode for photographing a 2D still picture, and a flag indicating that the compound-eye digital camera 1 is placed in the 2D mode is set in a 2D/3D mode switching flag setting device 50. Further, by setting the mode dial 72 at "2D moving picture position", the compound-eye digital camera 1 is set into 2D moving picture photographing mode for photographing a 2D moving picture, and a flag indicating that the compound-eye digital camera 1 is placed in the 2D mode is set in the 2D/3D mode switching flag setting device 50.

By setting the mode dial 72 at "3D still picture position", the compound-eye digital camera 1 is set into 3D still picture photographing mode for photographing a 3D still picture, and a flag indicating that the compound-eye digital camera 1 is placed in the 3D mode is set in the 2D/3D mode switching flag setting device 50. Further, by setting the mode dial 72 at "3D moving picture position", the compound-eye digital camera 1 is set into 3D moving picture photographing mode for photographing a 3D moving picture, and a flag indicating that the compound-eye digital camera 1 is placed in the 3D mode is set in the 2D/3D mode switching flag setting device 50. A main CPU 10 (will be described later) refers to the 2D/3D mode switching flag setting device 50 to identify whether the compound-eye digital camera 1 is placed in the 2D mode or the 3D mode.

The zoom button 73 is used for zooming the first imaging system 2a and the second imaging system 2b, and is made up of a zoom tele button for providing an instruction for zooming to a telescopic side and a zoom wide button for providing an instruction for zooming to a wide-angle side.

The cross button 74 is a button for setting and selecting various menus or performing zooming. The cross button 74 enables presses in four directions of left, right, top and bottom. Each direction button is assigned a function corresponding to a setting state of the camera. For example, during photographing, a left button is assigned the function of switching on/off a macro function, and a right button is assigned the function of switching strobe modes. Further, a top button is assigned the function of changing the luminance of the monitor 6, and a bottom button is assigned the function of switching on/off a self timer. Moreover, during reproduction, the right button is assigned the function of frame-by-frame advance in the forward direction and the left button is assigned the function of frame-by-frame advance in the backward direction. Further, the top button is assigned the function of changing the luminance of the monitor 6 and the bottom button is assigned the function of erasing a reproduced image. Moreover, during the setting, each button is assigned the function of moving a cursor displayed on the monitor 6 to the direction of each button.

The MENU/OK button 75 is used for a call on a menu screen (MENU function), determining selected contents, and providing an instruction for executing processing (OK function). The assigned functions of the MENU/OK button 75 are switched according to the set state of the compound-eye digital camera 1. On the menu screen, all the adjustment items of the compound-eye digital camera 1 are set. For example, the items include image quality adjustments on an exposure value, colors, an ISO sensitivity and the number of recording pixels, the setting of a self timer, the switching of metering systems, and a decision on whether to use a digital zoom. The compound-eye digital camera 1 operates according to conditions set on the menu screen.

The DISP button 76 is used for inputting an instruction and the like for switching displayed contents on the monitor 6. The BACK button 77 is used for inputting an instruction for cancelling an input.

The strobe 4 is made up of the two xenon tubes of a strobe 4a for the first imaging system 2a and a strobe 4b for the second imaging system 2b. The strobe 4 provides a flashing light as necessary, for example, when a dark subject is photographed or a subject is photographed against the light.

The release switch 5 is made up of a switch for a two-step stroke of so-called "half press" and "full press". When the release switch 5 is half-pressed in the photographing of a still picture (for example, when the still picture photographing mode is selected by the mode dial 72 or when the still picture photographing mode is selected from the menu), the compound-eye digital camera 1 prepares for photographing, that is, the compound-eye digital camera 1 performs each processing of automatic exposure (AE), auto focus (AF), and automatic white balance (AWB). When the release switch 5 is fully pressed, the compound-eye digital camera 1 photographs and records an image. Further, when the release switch 5 is fully pressed in the photographing of a moving picture (for example, when the moving picture photographing mode is selected by the mode dial 72 or when the moving picture photographing mode is selected from the menu), the compound-eye digital camera 1 starts photographing the moving picture. When the release switch 5 is fully pressed again, the photographing of the moving picture is completed. The compound-eye digital camera 1 may be set so as to photograph a moving picture while the release switch 5 is fully pressed, and then complete the photographing of the moving picture when the release switch 5 is released. Further, a shutter button for photographing a still picture only and a shutter button for photographing a moving picture only may be provided.

The monitor 6 is a 3D monitor of a parallax barrier system having a typical aspect ratio of 4 to 3 or a 3D monitor with a lenticular lens. The monitor 6 is used as an electronic view finder when an image is photographed. During the reproduction of an image, the monitor 6 provides stereoscopic display of image data obtained by photographing the image. The monitor 6 has a parallax barrier display layer on the surface. The specific configurations of the monitor 6 are not shown. During stereoscopic display, the monitor 6 generates a parallax barrier including light transmitting parts and light shielding parts which are alternately arranged at a predetermined pitch on the parallax barrier surface layer, and the monitor 6 displays, on an image display surface under the parallax barrier surface layer, strip-like images which are alternately arranged so as to display right and left images, so that a stereoscopic view can be provided. The configuration of a display device enabling a stereoscopic view is not always limited to a parallax system using a sheet with an array of slits. A lenticular system using a lenticular lens sheet, an integral photography system using a micro lens array sheet, a holography system using an interference phenomenon, and so on may be also used. Further, the monitor 6 may include liquid crystal and organic EL display elements enabling both two-dimensional and three-dimensional displays, and may emit light by itself or include another light source with a controlled amount of light. Further, any system such as a polarizing system, an anaglyph system, a naked eye system may be used. Moreover, light crystal and organic EL display elements may be stacked in multiple layers. The monitor 6 can display two-dimensional and three-dimensional images by switching driving modes.

Figure 4:
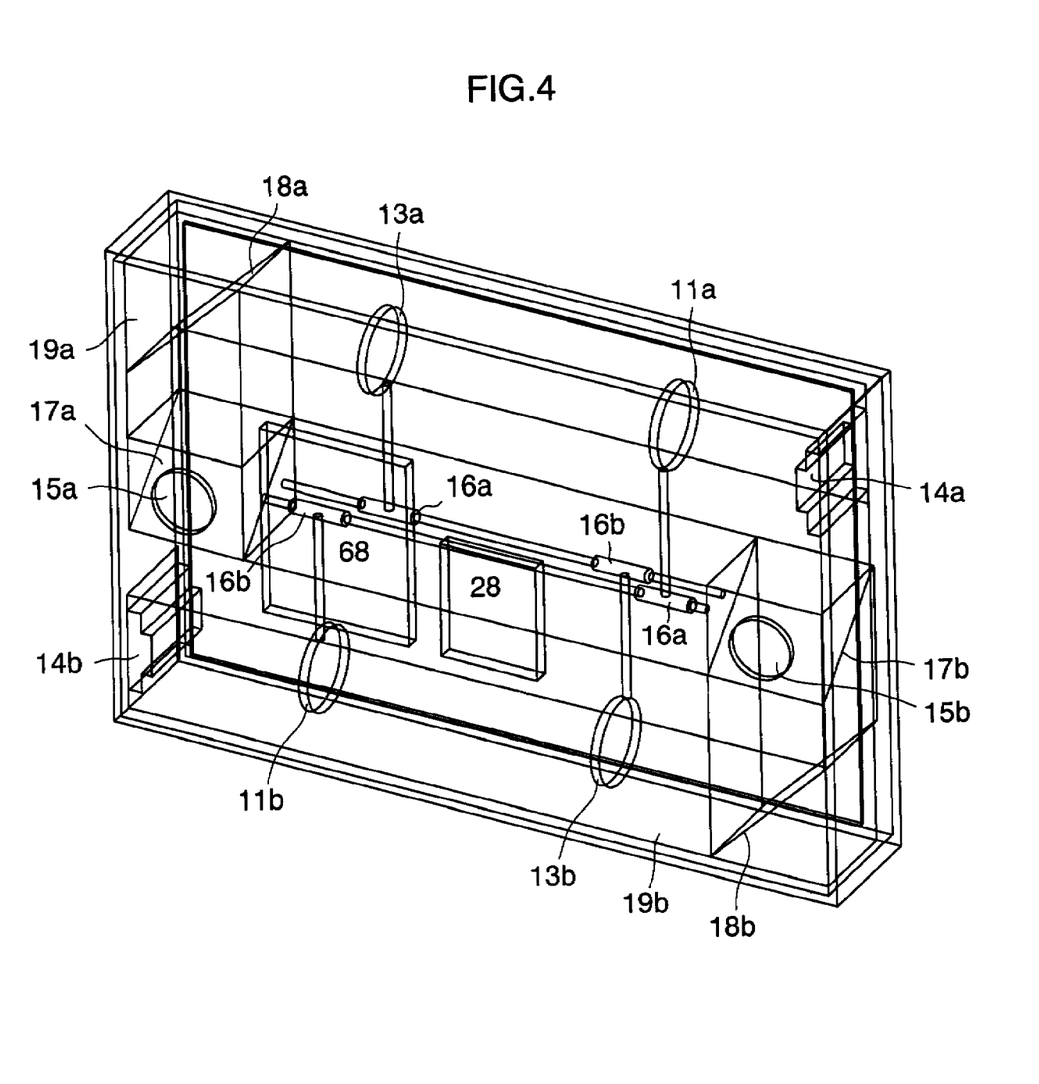
FIG. 4 is a front perspective view transparently showing the main part of the compound-eye digital camera 1.

The following will describe the internal configuration of the compound-eye digital camera 1. The compound-eye digital camera 1 of the present embodiment is characterized in that the first imaging system 2a and the second imaging system 2b are each refracted at least on one point to increase the optical path length and reduce the size of the camera body 7. FIG. 3 is a perspective view showing the main part of the first imaging system 2a and the second imaging system 2b. FIG. 4 is a front perspective view transparently showing the main part of the compound-eye digital camera 1.

First, the first imaging system 2a and the second imaging system 2b will be described. The first imaging system 2a comprises the first objective lens 15a disposed along the lens optical axis L1, a first reflective optical element 17a for the first imaging system, a second reflective optical element 18a for the first imaging system, first focus lenses 11a, a first diaphragm 12a, first zoom lenses 13a, a first image sensor 14a, and a first lens barrel 19a. The second imaging system 2b comprises the second objective lens 15b disposed along the lens optical axis L2, a first reflective optical element 17b for the second imaging system, a second reflective optical element 18b for the second imaging system, second zoom lenses 13b, a second diaphragm 12b, second focus lenses 11b, a second image sensor 14b, and a second lens barrel 19b. The second imaging system 2b is identical in configuration to the first imaging system 2a. Thus, only the first imaging system 2a will be described below and the explanation of the second imaging system 2b will be omitted.

Hereinafter, the first reflective optical element 17a for the first imaging system, the second reflective optical element 18a for the first imaging system, the first reflective optical element 17b for the second imaging system and the second reflective optical element 18b for the second imaging system, are called the first-first reflective optical element 17a, the second-first reflective optical element 18a, the first-second reflective optical element 17b and the second-second reflective optical element 18b, respectively.

The first focus lenses 11a are disposed on the lens optical axis L1-3. The first focus lenses 11a are moved to one of NEAR side and INF side along the lens optical axis L1 to change the focus position during an autofocus (AF) operation, so that the focus is adjusted. The first focus lenses 11*a* are moved by a lens driving section 16*a* in a similar manner to the first zoom lenses 13*a*.

The first diaphragm 12*a* (not shown in FIGS. 3 and 4) is disposed on the lens optical axis L1-3. The first diaphragm 12*a* changes an aperture value (f-stop number) to limit luminous fluxes during an auto exposure (AE) operation, so that the exposure is adjusted.

The first zoom lenses 13*a* are disposed on the lens optical axis L1-3. The first zoom lenses 13*a* are moved to one of NEAR side (extension side) and INF side (retraction side) along the lens optical axis L1 in response to a zooming operation from the operation part 3, so that the zoom factor is changed. The first zoom lenses 13*a* are moved by the lens driving section 16*a*. The zooming operation performed by the lens driving section 16*a* is a known technique and thus the detailed explanation thereof is omitted.

The first image sensor 14*a* is a CCD or CMOS image sensor disposed on the lens optical axis L1-3. The first image sensor 14*a* receives the light of a subject image formed by the first objective lens 15*a*, the first zoom lenses 13*a*, the first diaphragm 12*a*, and the first focus lenses 11*a* and accumulates optical charge in a light receiving element according to the amount of received light.

The first objective lens 15*a* is provided on the front side of the camera body 7 and is disposed on a first lens optical axis L1-1. The lens optical axis L1-1 is refracted by about 90° by the first-first reflective optical element 17*a*, and a lens optical axis L1-2 having been refracted by the first-first reflective optical element 17*a* is refracted by about 90° by the second-first reflective optical element 18*a* so as to be orthogonal to the lens optical axis L1-1. As a result, a lens optical axis L1-3 having been refracted by the second-first reflective optical element 18*a* and the lens optical axis L1-1 are skew relative to each other.

The first lens barrel 19*a* (not shown in FIG. 3) has the first objective lens 15*a* disposed on the front side and includes the first zoom lenses 13*a*, the first diaphragm 12*a*, the first focus lenses 11*a*, the first image sensor 14*a*, the first-first reflective optical element 17*a*, and the second-first reflective optical element 18*a*. Further, the first lens barrel 19*a* is substantially L-shaped and is refracted along the lens optical axes L1-1, L1-2 and L1-3. Thus it is possible to prevent the first lens barrel 19*a* from expanding in the longitudinal or lateral direction, and increase the optical path length.

Since the first imaging system 2*a* and the second imaging system 2*b* are identical in configuration, it is not necessary to provide a corrective optical system for equalizing the sizes of images photographed by the first imaging system 2*a* and the second imaging system 2*b*, unlike the case where the first imaging system 2*a* and the second imaging system 2*b* have different configurations. Further, the lenses and the mold of the reflective optical element can be shared, thereby reducing the cost.

The layout of the first imaging system 2*a* and the second imaging system 2*b* will be described below. In the first imaging system 2*a* and the second imaging system 2*b*, the first objective lens 15*a* and the second objective lens 15*b* are disposed near the ends of the camera body 7. The first lens barrel 19*a* and the second lens barrel 19*b* are each provided along the two adjacent inner surfaces of the camera body 7 and are opposed to each other so as to have point symmetry with respect to the center of the camera body 7. In the present embodiment, the first lens barrel 19*a* and the second lens barrel 19*b* are substantially L-shaped. Thus the first lens barrel 19*a* and the second lens barrel 19*b* are arranged like a ring when viewed from the front side. This configuration can reduce the thickness of the camera body 7 to about the size of one lens. Further, this configuration can increase the areas of the front and back sides of the camera body 7.

Since the camera body 7 is reduced in thickness, the camera body 7 can be so shaped as to be easily held by an operator with the hand. Since the area of the back side of the camera body 7 is increased, the monitor 6 (typical size with an aspect ratio of 4:3 or 16:9) disposed on the back side of the camera body 7 can have a large footprint. Thus a large display device can be mounted. Further, since the area of the back side of the camera body 7 is increased, the operation part 3 can be disposed on the right side of the back side of the camera body 7 like many compact digital cameras currently on the market, thereby achieving the same sense of operation as compact digital cameras.

The lens driving sections 16*a* and 16*b*, the memory card 38, the battery 68, and so on are disposed in a central part surrounded by the first lens barrel 19*a* and the second lens barrel 19*b*. On the back sides of the first lens barrel 19*a* and the second lens barrel 19*b*, a main board is disposed. On the top surfaces of the first lens barrel 19*a* and the second lens barrel 19*b*, operation boards are disposed. Main components including the lens driving sections 16*a* and 16*b*, the memory card 38, and the battery 68 are disposed in a vacant space of the central part, thereby reducing the size of the compound-eye digital camera 1.

Figure 5:
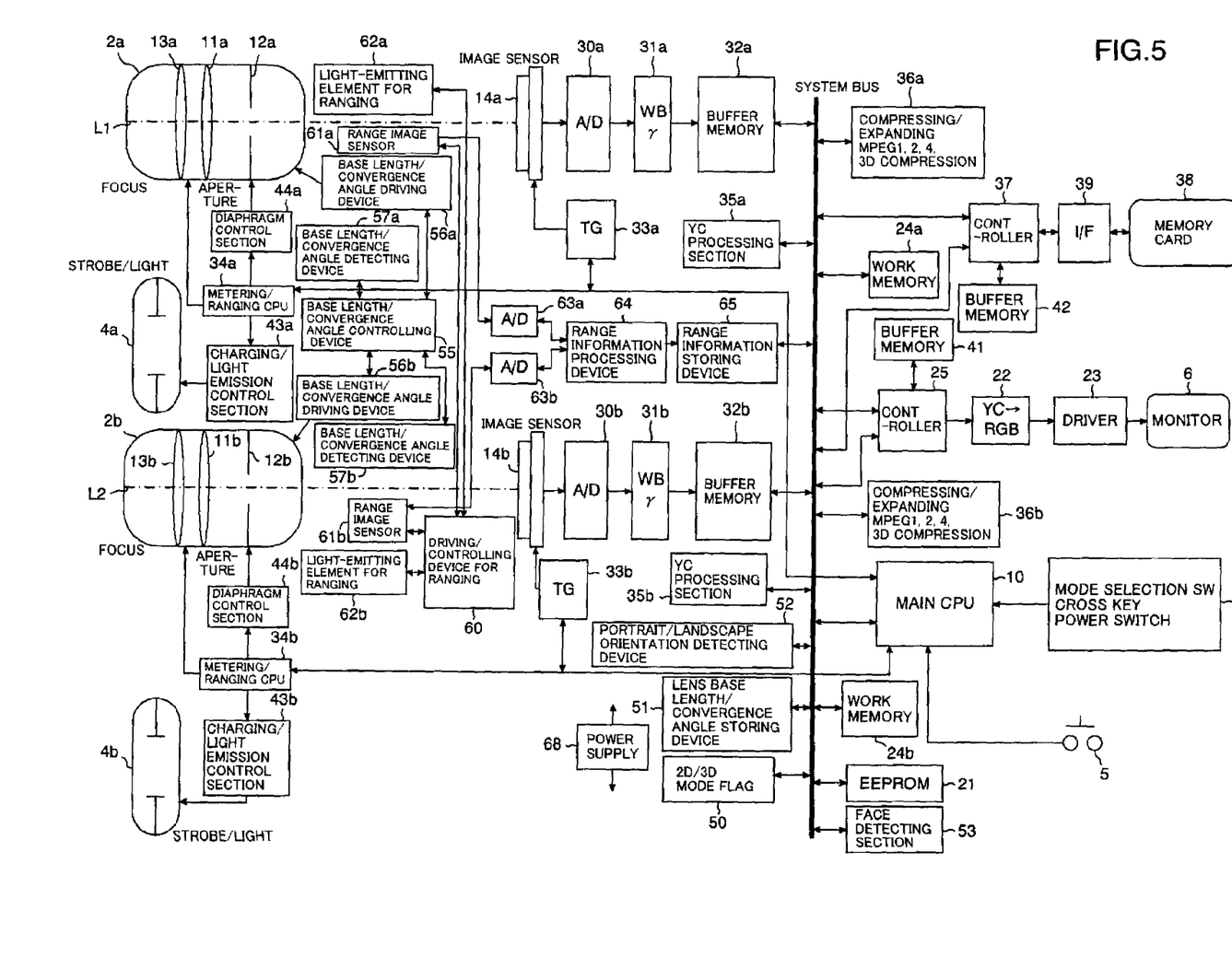
FIG. 5 is a block diagram showing the compound-eye digital camera 1.

FIG. 5 is a block diagram showing the electrical configuration of the compound-eye digital camera 1. The compound-eye digital camera 1 can photograph a single viewpoint image (two-dimensional image) and a multiple viewpoint image (three-dimensional image) and can record and reproduce a moving picture, a still picture, and a voice. Further, a moving picture and a still picture can be both photographed as multiple viewpoint images as well as single viewpoint images.

The operations of the first imaging system 2*a* and the second imaging system 2*b* are controlled by the main CPU 10. The first imaging system 2*a* and the second imaging system 2*b* are basically operated in synchronization with each other and can be also operated in a separated manner. A diaphragm control section 44*a* is connected to the first diaphragm 12*a* and a diaphragm control section 44*b* is connected to the second diaphragm 12*b*. The operations of the first diaphragm 12*a*, the second diaphragm 12*b*, the first focus lenses 11*a*, and the second focus lenses 11*b* are controlled by a metering/ranging CPU 34*a*. The operations of timing generators (TGs) 33*a* and 33*b* are controlled by the main CPU 10.

The TG 33*a* is connected to the first image sensor 14*a* and the TG 33*b* is connected to the second image sensor 14*b*. Imaging signals outputted from the first image sensor 14*a* and the second image sensor 14*b* of the first imaging system 2*a* and the second imaging system 2*b* are inputted to A/D converters 30*a* and 30*b*, respectively. The optical charge accumulation and transfer of the first image sensor 14*a* are controlled by the timing generator (TG) 33*a*, and an electronic shutter speed (optical charge accumulation time) is determined by a timing signal (clock pulse) inputted from the TG 33*a*. In photographing mode, the first image sensor 14*a* acquires an image signal of one screen in each predetermined cycle. When a half-pressed state of a release switch 5*a* for a still picture is detected, the main CPU 10 obtains distance-measuring data from the first image sensor 14*a*. The main CPU 10 adjusts the focus, aperture, and so on based on the obtained distance-measuring data.

The A/D converters 30*a* and 30*b* convert inputted image data from analog data to digital data. Through the A/D converters 30*a* and 30*b*, the imaging signal of the first image sensor 14a is outputted as image data for a right eye and the imaging signal of the second image sensor 14b is outputted as image data for a left eye.

Image signal processing devices 31a and 31b perform image processing such as gradation transformation, a white balance adjustment, and a y adjustment on the inputted image data for a right eye and the inputted image data for a left eye from the A/D converters 30a and 30b.

Buffer memories 32a and 32b temporarily store the image data for a right eye and the image data for a left eye after the image processing is performed on the image data in the image signal processing devices 31a and 31b. The image data for a right eye and the image data for a left eye stored in the buffer memories 32a and 32b are outputted through a system bus.

The main CPU 10, an EEPROM 21, work memories 24a and 24b, a controller 25, the buffer memories 32a and 32b, YC processing sections 35a and 35b, compressing/expanding devices 36a and 36b, a medium controller 37, a 2D/3D mode switching flag setting device 50, a base length/convergence angle storing device 51, a portrait/landscape orientation detecting device 52, a face detecting section 53, and so on are connected to the system bus.

The main CPU 10 collectively controls the overall operations of the compound-eye digital camera 1. The operation part 3, the release switch 5, the 2D/3D setting switch, a base length/convergence angle controlling device 55, and a driving/controlling device 60 for ranging are connected to the main CPU 10.

The base length/convergence angle controlling device 55 controls base length/convergence angle driving devices 56a and 56b based on a base length and a convergence angle which have been stored in the base length/convergence angle storing device 51, and the base length/convergence angle controlling device 55 adjusts the base length (a distance between the first imaging system 2a and the second imaging system 2b) and the convergence angle (an angle formed by the lens optical axis L1 of the first imaging system 2a and the lens optical axis L2 of the second imaging system 2b) of the first imaging system 2a and the second imaging system 2b.

The base length/convergence angle driving devices 56a and 56b are connected to the base length/convergence angle controlling device 55 and drive the first imaging system 2a and the second imaging system 2b in response to an instruction from the base length/convergence angle controlling device 55.

Base length/convergence angle detecting devices 57a and 57b are connected to the base length/convergence angle controlling device 55 and the base length/convergence angle driving devices 56a and 56b and detect the base length and the convergence angle of the first imaging system 2a and the second imaging system 2b which are driven by the base length/convergence angle driving devices 56a and 56b, respectively. The base length/convergence angle controlling device 55 outputs an instruction to the base length/convergence angle driving devices 56a and 56b based on the base length and the convergence angle which have been read from the base length/convergence angle storing device 51 and the base length and the convergence angle which have been detected by the base length/convergence angle detecting devices 57a and 57b.

The driving/controlling device 60 for ranging performs control for synchronizing the light emission timing of light-emitting elements 52a and 52b for ranging, and range image sensors 53a and 53b.

Light-emitting elements 62a and 62b for ranging are made up of light-emitting diodes (LEDs) for emitting spots of light to the same subject captured by the first imaging system 2a and the second imaging system 2b.

Range image sensors 61a and 61b are two-dimensional image sensors provided for measuring a distance (ranging). The range image sensors 61a and 61b obtain a subject image on which spots of light have been emitted from the light-emitting elements 52a and 52b for ranging. Analog image signals obtained by the imaging operations of the range image sensors 61a and 61b are converted to digital image data in distance measuring A/D converting sections 63a and 63b, and then the image data is outputted to a range information processing device 64.

The range information processing device 64 measures time until lights emitted from the light-emitting elements 62a and 62b for ranging are reflected on the subject and return to the range image sensors 61a and 61b, and the range information processing device 64 calculates, based on formula 1, and a distance (range) to the subject captured by the range image sensors 61a and 61b. Further, a range image in which a pixel value of each pixel is the distance is generated using the calculated results.

$$L = c \times Td/2 \quad \text{(L: distance, c: velocity of light, Td: reflection time)} \quad \text{[Formula 1]}$$

A range information storing device 65 stores range information inputted from the range information processing device 64, that is, the range images photographed by the range image sensors 61a and 61b.

The EEPROM 21 is a nonvolatile memory for storing programs for various kinds of control, setting information, and so on. The main CPU 10 performs various kinds of processing based on the programs and the setting information.

A YC/RGB processing section 22 converts the YC signals of the image data for a right eye and the image data for a left eye to video signals of a predetermined system (e.g., a color composite video signal of the NTSC system (NTSC: National Television System Committee)), combines the signals to stereoscopic image data for providing stereoscopic display on the monitor 6, and outputs the data to an LCD driver 23 for display. When the monitor 6 is used as an electronic view finder in the photographing mode, the stereoscopic image data synthesized by the YC/RGB processing section 22 is displayed as a live view image (pass-through image) on the monitor 6 through the LCD driver 23. Further, when image data obtained by photographing is stereoscopically displayed, the image data recorded in the memory card 38 is read by the medium controller 37, is expanded by the compressing/expanding devices 36a and 36b, and is converted to stereoscopic image data by the YC/RGB processing section 22. The stereoscopic image data is displayed as a reproduced image on the monitor 6 through the LCD driver 23.

The LCD driver 23 outputs, to the monitor 6, an RGB signal having been outputted from the YC/RGB processing section 22.

The work memories 24a and 24b store the YC signals having been processed in the YC processing sections 35a and 35b.

The controller 25 reads the YC signals of the image data for a right eye and the image data for a left eye into the YC/RGB processing section 22, the YC signals having been stored in the work memories 24a and 24b.

The YC processing sections 35a and 35b convert the image data stored in the buffer memories 32a and 32b to a luminance signal (Y signal) and color-difference signals (Cr, Cb signals) and perform predetermined processing such as gamma adjustment.

The compressing/expanding devices 36a and 36b compress the image data for a right eye and the image data for a left eye which have been stored in the work memories 24a and 24b, according to predetermined compression formats including JPEG for a still picture and MPEG2, MPEG4, and H.264 for a moving picture.

The medium controller 37 records the image data having been compressed by the compressing/expanding devices 36a and 36b, on the memory card 38 or other recording media which are connected via an I/F 39.

The memory card 38 includes a variety of recording media which can be inserted into and removed from the compound-eye digital camera 1, such as a semiconductor memory card typified by an xD picture card (registered trademark) and SmartMedia (registered trademark), a portable and compact hard disk, a magnetic disk, an optical disk, and a magneto-optical disk.

In the 2D/3D mode switching flag setting device 50, the flag indicating one of the 2D mode and the 3D mode is set.

The base length/convergence angle storing device 51 calculates a proper base length and convergence angle based on the metering/ranging CPUs 34a and 34b, and stores the base length and convergence angle.

The portrait/landscape orientation detecting device 52 detects whether to photograph an image in a portrait orientation or a landscape orientation, by means of a built-in sensor (not shown). The portrait/landscape orientation detecting device 52 may detect the portrait or landscape orientation set by an input of an instruction.

The face detecting section 53 detects the face of a subject according to various known techniques.

The compound-eye digital camera 1 further includes a removable power supply 68.

The power supply 68 is made up of a chargeable secondary battery, for example, a NiCad battery, a nickel hydrogen battery, and a lithium-ion battery. The power supply 68 may be made up of a primary battery for single use, for example, a lithium battery and an alkaline battery. The power supply 68 is loaded in a battery room (not shown), so that the power supply 68 is electrically connected to the devices of the compound-eye digital camera 1.

Charging/light emission control sections 43a and 43b are fed with power from the power supply 68, charge flashing capacitors (not shown) to emit light from the strobes 4a and 4b, and control the light emission of the strobes 4a and 4b.

The charging/light emission control sections 43a and 43b control current supply to the strobes 4a and 4b when receiving signals including the half press/full press signals of the release switch 5 and signals indicating an amount of light and the timing of light emission from the main CPU 10 and the metering/ranging CPUs 34a and 34b, and the charging/light emission control sections 43a and 43b control charging and light emission so as to obtain a desired amount of light at a desired time.

The compound-eye digital camera 1 of FIG. 3 includes two imaging systems (the first imaging system 2a and the second imaging system 2b) and may include three or more imaging systems. Further, the imaging systems may have a two-dimensional arrangement instead of a side-by-side arrangement. Moreover, the compound-eye digital camera 1 of FIG. 1 enables not only stereoscopic photographing but also photographing from multiple viewpoints and in all directions.

The following will describe the photographing, recording, and reproducing operations of the compound-eye digital camera 1 configured thus.

In the compound-eye digital camera 1, when the power button 71 is turned on, the main CPU 10 detects the power on, turns on a power supply built in the camera, and brings the compound-eye digital camera 1 into a photographing standby state in the photographing mode.

In the photographing standby state, the main CPU 10 normally displays a moving picture (live view image) on the monitor 6 as follows:

First, the main CPU 10 refers to the 2D/3D mode switching flag setting device 50 to detect whether the compound-eye digital camera 1 is placed in the 2D mode for obtaining a single viewpoint image (two-dimensional image) or the 3D mode for obtaining a multiple viewpoint image (three-dimensional image). In the 2D mode, only the first imaging system 2a is driven. In the 3D mode, the first imaging system 2a and the second imaging system 2b are driven.

The first and second objective lenses 15a and 15b are exposed by opening the covers. Subject lights coming through the first and second objective lenses 15a and 15b are reflected on the first-first reflective optical element 17a and the second-first reflective optical element 18a, and the first-second reflective optical element 17b and the second-second reflective optical element 18b, respectively. Thereafter, the zooming factor is adjusted and focusing is obtained through the first zoom lenses 13a, the second zoom lenses 13b, the first focus lenses 11a, and the second focus lenses 11b, and images are formed on the first image sensor 14a and the second image sensor 14b, respectively. In this way, images are consecutively captured by the first image sensor 14a and the second image sensor 14b and the image signals are consecutively processed to generate image data for a live view image. The generated image data is sequentially added to the controller 25, is converted to a signal format for display, and is outputted to the monitor 6. Thus, the pass-through display of the images captured by the first image sensor 14a and the second image sensor 14b is provided on the monitor 6.

A user (photographer) performs framing, confirms a subject to be photographed, confirms a photographed image, and sets photographing conditions while viewing the live view image displayed on the monitor 6.

When the release switch 5 is half-pressed in the photographing standby state, a S1ON signal is inputted to the main CPU 10. The main CPU 10 detects the signal and performs AE metering and AF control. During AE metering, the main CPU 10 meters the luminance of a subject based on an integrated value and so on of the image signals captured through the first image sensor 14a and the second image sensor 14b. The metered value (photometric value) is used for determining the f-stop numbers of the first diaphragm 12a and the second diaphragm 12b and a shutter speed during photographing. Simultaneously, the main CPU 10 decides whether a strobe light is necessary or not based on the detected subject luminance. When the main CPU 10 decides that light from the strobes 4a and 4b is necessary, a pre-flash is fired from the strobes 4a and 4b and a required amount of light from the strobes 4a and 4b in photographing is determined based on the reflected light. In the 3D mode, the base length and convergence angle of the first imaging system 2a and the second imaging system 2b are further adjusted based on information about a base length and a convergence angle which are stored in the base length/convergence angle storing device 51 for each photographer.

When the release switch 5 is fully pressed, a S2ON signal is inputted to the main CPU 10. The main CPU 10 performs photographing and recording in response to the S2ON signal.

First, the main CPU 10 drives the first diaphragm 12a and the second diaphragm 12b through the diaphragm control sections 44a and 44b based on the f-stop number determined based on the metered value, and controls the charge accumulation times (so-called electronic shutter) of the first image sensor 14a and the second image sensor 14b so as to have a shutter speed determined based on the metered value.

Further, the main CPU 10 calculates an AF evaluation value and an AE evaluation value from the image data for a right eye and the image data for a left eye which are stored in the buffer memories 32a and 32b. The AF evaluation value is calculated by summing the high frequency components of luminance values in all the regions or a predetermined region (for example, the central part) of each image data, and the AF evaluation value indicates the sharpness of the image. The high frequency components of luminance values are obtained by adding luminance differences (contrasts) between adjacent pixels in a predetermined region. The AE evaluation value is calculated by summing luminance values in all the regions or a predetermined region (for example, the central part) of each image data, and the AE evaluation value indicates the brightness of the image. The AF evaluation value and the AE evaluation value are respectively used in an AF operation and an AE operation which are performed in preparation for photographing (will be described later).

While controlling the first focus lenses 11a and the second focus lenses 11b so as to move the lenses in predetermined directions, the main CPU 10 determines the maximum value of AF evaluation values calculated from the sequentially obtained image data for a right eye and image data for a left eye, so that the AF operation (contrast AF) is performed.

In this case, when light is emitted from the strobes 4a and 4b, the amounts of light emitted from the strobes 4a and 4b are determined based on the result of pre-flashing.

Subject light is incident on the light receiving surface of the first image sensor 14a through the first objective lens 15a, the first focus lenses 11a, the first diaphragm 12a, and the first zoom lenses 13a. Further, the subject light is incident on the light receiving surface of the second image sensor 14b through the second objective lens 15b, the second focus lenses 11b, the second diaphragm 12b, and the second zoom lenses 13b.

The first image sensor 14a and the second image sensor 14b are made up of color CCDs provided with R, G, and B color filters in a predetermined color filter array (for example, a honeycomb array and a Bayer array). Light incident on the light receiving surfaces of the first image sensor 14a and the second image sensor 14b is converted to signal charges according to the amounts of incident light by photodiodes arranged on the light receiving surfaces. The signal charges accumulated in the photodiodes are read according to timing signals applied from the timing generators (TGs) 33a and 33b, are sequentially outputted as voltage signals (image signals) from the first image sensor 14a and the second image sensor 14b, and are inputted to the A/D0 converters 30a and 30b.

The A/D converters 30a and 30b each include a CDS circuit and an analog amplifier. The CDS circuit performs correlated double sampling on a CCD output signal based on a CDS pulse, and the analog amplifier amplifies an image signal outputted from the CDS circuit, according to a gain for setting a photographing sensitivity. The gain is applied from the main CPU 10. In the A/D converters 30a and 30b, the analog image signals are converted to digital image signals, respectively.

The image data for a right eye and the image data for a left eye outputted from the A/D converters 30a and 30b undergo image processing such as gradation transformation, a white balance adjustment, and a γ adjustment in the image signal processing devices 31a and 3 b, and the image data is temporarily stored in the buffer memories 32a and 32b.

The R, G and B image signals read from the buffer memories 32a and 32b are converted to a luminance signal (Y signal) and Cr and Cb signals (YC signals) by the YC processing sections 35a and 35b, and edge enhancement is performed on the Y signal by an edge enhancing device. The YC signals processed by the YC processing sections 35a and 35b are stored in the work memories 24a and 24b, respectively.

The YC signals stored thus in the buffer memories 32a and 32b are compressed by the compressing/expanding devices 36a and 36b, and are recorded as image files of a predetermined format in the memory card 38 through the I/F 39. In the case of the compound-eye digital camera 1 of the present example, two-dimensional image data of a still picture is stored in the memory card 38 as an image file conforming to the Exif (Exchangeable image file format) standard. The Exif file has a region for storing main image data and a region for storing data of a reduced image (thumbnail image). From the main image data obtained by photographing, pixels are thinned out and other necessary data processing is performed, so that a thumbnail image of a predetermined size (e.g., 160×120 or 80×60 pixels) is generated. The thumbnail image generated thus is written with the main image in the Exif file. The Exif file is provided with tag information including a date of photographing, photographing conditions, and face detection information. Moving picture data is compressed according to a predetermined compression format such as MPEG2, MPEG4, H.264, and is stored in the memory card 38.

The main CPU 10 controls the driving/controlling device 60 for ranging in response to the S2ON signal, and obtains subject images on which spots of light have been emitted from the light-emitting elements 52a and 52b for ranging, through the range image sensors 61a and 61b. The obtained subject images are processed in the range information processing device 64, and a range image in which the pixel values of pixels are distance values is generated and stored in the range information storing device 65. Further, the range image is recorded in the memory card 38 with an image file of the predetermined format.

The image data recorded thus in the memory card 38 is reproduced and displayed on the monitor 6 by setting the compound-eye digital camera 1 at the playback mode. The compound-eye digital camera 1 is shifted to the playback mode by pressing the power button 71.

When the playback mode is selected, the image file of the final frame recorded in the memory card 38 is read through the I/F 39. The compressed data of the image file read thus is expanded to uncompressed YC signals through the compressing/expanding devices 36a and 36b.

The expanded YC signals are stored in the buffer memories 32a and 32b (or in a not shown VRAM), are converted to signal formats for display by the controller 25, and are outputted to the monitor 6. Thus the image of the final frame recorded in the memory card 38 is displayed on the monitor 6.

Thereafter, when a forward frame advance switch (the right key of the cross button 74) is pressed, a frame proceeds in the forward direction. When a backward frame advance switch (the left key of the cross button 74) is pressed, a frame proceeds in the backward direction. Further, an image file on the position designated by the frame step function is read from the memory card 38 and the image of the file is reproduced on the monitor 6 in the above-described manner.

An image recorded in the memory card 38 can be deleted as necessary during the confirmation of the image reproduced and displayed on the monitor 6. An image can be deleted by operating the MENU/OK button 75 while the image is reproduced and displayed on the monitor 6.

The compound-eye digital camera 1 photographs, records, and reproduces images in the above-described manner. The above explanation described the photographing of a still picture. A moving picture can be photographed in a similar manner. The photographing of a moving picture and a still picture is controlled by the respective release buttons. Further, a moving picture and a still picture may be switched by a mode select SW of a moving picture and a still picture or a menu.

The present embodiment can attain the contradictory objectives of increasing the optical path length and reducing the thickness and size of the compound-eye digital camera.

Further, since a long optical path length can be achieved, a telephoto lens can be disposed in a compact body of camera.

In the present embodiment, the two imaging systems of the first imaging system 2a and the second imaging system 2b are used to photograph a stereoscopic image. More than two imaging systems may be provided as long as a stereoscopic image can be photographed. For example, two first imaging systems 2a and two second imaging systems 2b of the present embodiment may be provided so as to be adjacent to one another and a stereoscopic image may be photographed using the four imaging systems.

Further, in the present embodiment, the first lens barrel 19a and the second lens barrel 19b are substantially L-shaped. The first lens barrel 19a and the second lens barrel 19b may be substantially chevron-shaped, U-shaped, or have other shapes as long as the lens optical axis is refracted on at least one point.

Figure 6:
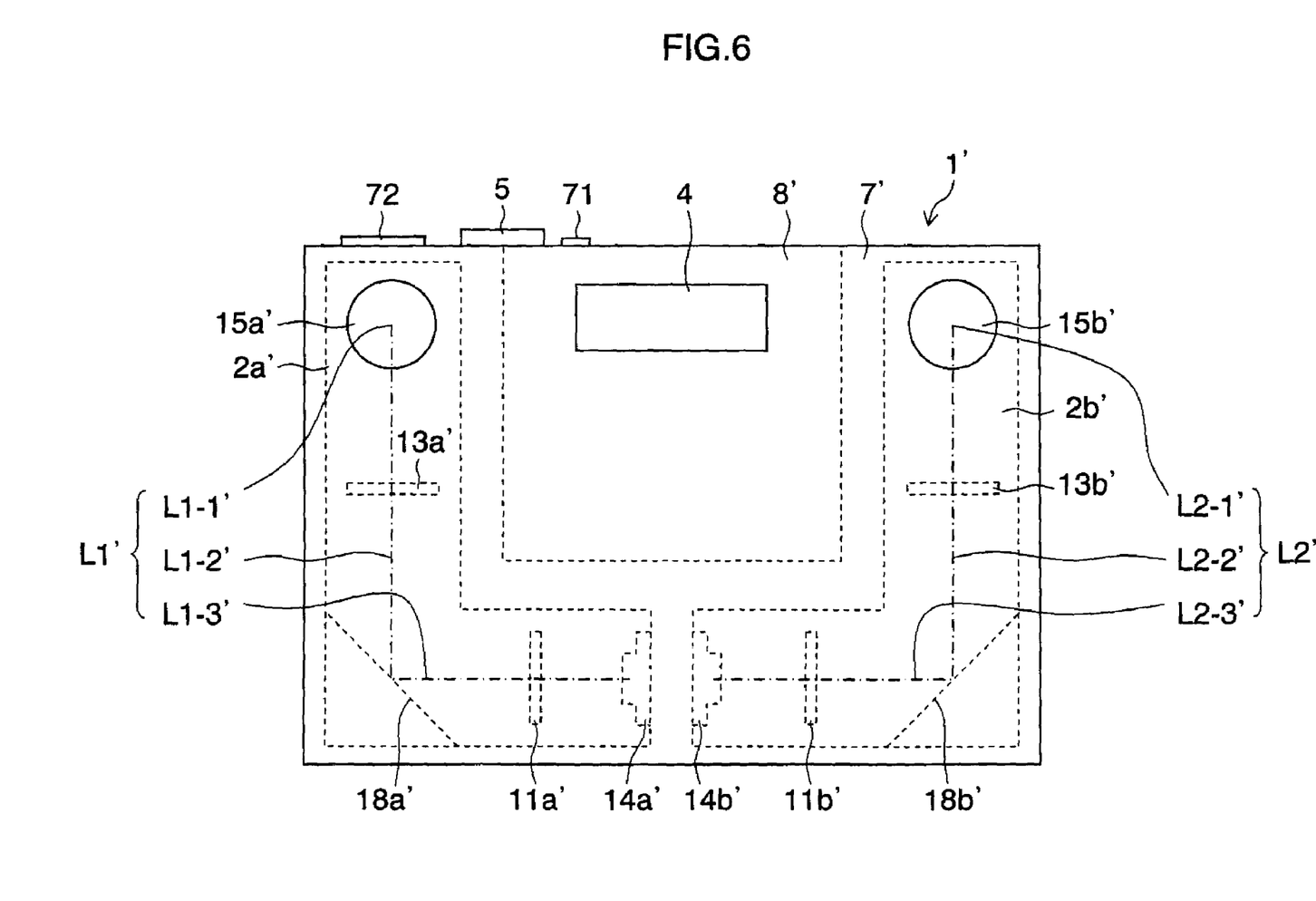
FIG. 6 is a front view showing a compound-eye digital camera 1 according to another embodiment.

Further, in the present embodiment, the first lens barrel 19a and the second lens barrel 19b are each disposed along the two adjacent inner surfaces of the camera body 7 and are opposed to each other so as to have point symmetry with respect to the center of the camera body 7. The layout method of the first lens barrel 19a and the second lens barrel 19b is not limited to this layout and the lens barrels may have line symmetry with respect to the vertical center line of the camera body 7. Referring to FIG. 6, the following will discuss the case where a first lens barrel 19a' and a second lens barrel 19b' are each disposed along the two adjacent inner surfaces of a camera body 7' and are opposed to each other so as to have line symmetry with respect to the vertical center line of the camera body 7'.

The first lens barrel 19a' is disposed along the right side of the camera body 7' and the right half of the bottom. The upper part of the front side of the first lens barrel 19a' has a first objective lens 15a' disposed on a lens optical axis L1-1'. The first lens barrel 19a' includes a first-first reflective optical element 17a' (not shown) disposed on the lens optical axis L1-1', a second-first reflective optical element 18a' and first zoom lenses 13a' which are disposed on a lens optical axis L1-2', and first focus lenses 11a', a first diaphragm 12a' (not shown) and a first image sensor 14a' which are disposed on a lens optical axis L1-3'. The lens optical axis L1-1' is refracted by about 90° by the first-first reflective optical element 17a', and the lens optical axis L1-2' refracted by the first-first reflective optical element 17a' is refracted by about 90° by the second-first reflective optical element 18a' so as to be orthogonal to the lens optical axis L1-1'. As a result, the lens optical axis L1-3' refracted by the second-first reflective optical element 18a' and the lens optical axis L1-1' are skew relative to each other.

The second lens barrel 19b' is disposed along the left side of the camera body 7' and the left half of the bottom. The upper part of the front side of the second lens barrel 19b' has a second objective lens 15b' disposed on a lens optical axis L2-1'. The second lens barrel 19b' includes a first-second reflective optical element 17b' (not shown) disposed on the lens optical axis L2-1', a second-second reflective optical element 18b' and second zoom lenses 13b' which are disposed on a lens optical axis L2-2', and second focus lenses 11b', a second diaphragm 12b' (not shown) and a second image sensor 14b' which are disposed on a lens optical axis L2-3'. The second lens barrel 19b' and its internal configuration are similar to the first lens barrel 19a' and its internal configuration, except for that they are line symmetry with the first lens barrel 19a' and its internal configuration. Thus the explanation of the second lens barrel 19b' is omitted.

The first lens barrel 19a' and the second lens barrel 19b' have line symmetry with respect to the vertical center line of the camera body 7, thereby expanding a region not including the first lens barrel 19a' and the second lens barrel 19b' in the central upper part of the camera body 7'. Thus, components including the battery 68 and the memory card 38 can be easily laid out. Further, the top surface of the camera body 7' is not covered with the first lens barrel 19a' and the second lens barrel 19b', so that a battery cover 8' can be disposed on the top surface of the camera body and the memory card 38 can be easily removed.

Moreover, the first objective lens 15a' and the second objective lens 15b' are disposed close to the top surface of the camera body 7', so that even when a compound-eye digital camera 1' is held by a hand, the first objective lens 15a' and the second objective lens 15b' are not covered with the hand. Further, the first zoom lenses 13a' and the second zoom lenses 13b' are respectively disposed on the lens optical axis L1-2' and the lens optical axis L2-2', thereby increasing a length along which the first zoom lenses 13a' and the second zoom lenses 13b' can move. Thus zoom lenses having high magnifications can be used.

What is claimed is:

1. A stereoscopic imaging device, comprising:
a camera body substantially shaped like a rectangular solid having a front side and a back side larger than other sides and including a display device on the back side; and
substantially L-shaped first and second lens barrels, each storing a refractive optical system including two reflective optical elements for refracting a photographing optical axis twice, the lens barrels guiding subject images incident on a pair of right and left objective lenses to image sensors, wherein the image sensors of the right and left objective lenses are operable to capture images by right and left objective lenses simultaneously,
wherein the pair of right and left objective lenses are each disposed adjacent to two inner surfaces facing each other in the camera body, and
wherein the substantially L-shaped first and second lens barrels are each disposed along two adjacent inner surfaces of the camera body.

2. The stereoscopic imaging device according to claim 1, wherein
the substantially L-shaped first and second lens barrels are disposed so as to have point symmetry with respect to a central point of the camera body.

3. The stereoscopic imaging device according to claim 1, wherein
the substantially L-shaped first and second lens barrels are disposed in the camera body so as to have line symmetry with respect to a vertical center line of the camera body.

4. The stereoscopic imaging device according to claim 1, wherein
the refractive optical system comprises:
an objective lens;

a first reflective optical element for refracting, by 90°, a photographing optical axis of the subject image incident through the objective lens;

a second reflective optical element for further refracting, by 90°, the photographing optical axis having been refracted by the first reflective optical element so as to be orthogonal to the photographing optical axis of the subject image incident on the objective lens;

zoom lenses; and focus lenses.

5. The stereoscopic imaging device according to claim 2, wherein the refractive optical system comprises:

an objective lens;

a first reflective optical element for refracting, by 90°, a photographing optical axis of the subject image incident through the objective lens;

a second reflective optical element for further refracting, by 90°, the photographing optical axis having been refracted by the first reflective optical element so as to be orthogonal to the photographing optical axis of the subject image incident on the objective lens;

zoom lenses; and focus lenses.

6. The stereoscopic imaging device according to claim 3, wherein the refractive optical system comprises:

an objective lens;

a first reflective optical element for refracting, by 90°, a photographing optical axis of the subject image incident through the objective lens;

a second reflective optical element for further refracting, by 90°, the photographing optical axis having been refracted by the first reflective optical element so as to be orthogonal to the photographing optical axis of the subject image incident on the objective lens;

zoom lenses; and focus lenses.

* * * * *